(12) United States Patent
Chung et al.

(10) Patent No.: US 12,541,996 B2
(45) Date of Patent: Feb. 3, 2026

(54) ELECTRONIC DEVICE, OPERATING METHOD OF ELECTRONIC DEVICE, AND RECORDING MEDIUM

(71) Applicant: Samsung Electronics Co., Ltd., Suwon-si (KR)

(72) Inventors: Heetak Chung, Suwon-si (KR); Kwanwoo Ko, Suwon-si (KR); Sungoh Kim, Suwon-si (KR); Kitae Yu, Suwon-si (KR); Dasom Lee, Suwon-si (KR); Hangyu Lee, Suwon-si (KR); Taeik Jang, Suwon-si (KR); Sehwan Jeon, Suwon-si (KR); Areum Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 18/446,833

(22) Filed: Aug. 9, 2023

(65) Prior Publication Data

US 2023/0386254 A1    Nov. 30, 2023

Related U.S. Application Data

(63) Continuation of application No. PCT/KR2021/019852, filed on Dec. 24, 2021.

(30) Foreign Application Priority Data

Mar. 15, 2021    (KR) .................. 10-2021-0033204

(51) Int. Cl.
*G06V 40/16* (2022.01)

(52) U.S. Cl.
CPC .......... *G06V 40/172* (2022.01); *G06V 40/168* (2022.01)

(58) Field of Classification Search
CPC .... G06V 40/172; G06V 40/168; G06V 10/82; G06V 40/171; G06F 3/00; G06F 3/01;
(Continued)

(56) References Cited

U.S. PATENT DOCUMENTS

| 2006/0158307 A1 | 7/2006 | Lee et al. |
| 2011/0043643 A1 | 2/2011 | Yu et al. |

(Continued)

FOREIGN PATENT DOCUMENTS

| CN | 103414814 A | 11/2013 |
| JP | 2007293399 A | 11/2007 |

(Continued)

OTHER PUBLICATIONS

International Search Report for PCT/KR2021/019852 mailed Mar. 29, 2022, 4 pages.

(Continued)

*Primary Examiner* — Wassim Mahrouka
(74) *Attorney, Agent, or Firm* — Nixon & Vanderhye, P.C.

(57) ABSTRACT

An example electronic device includes a communication circuit; a memory; and at least one processor. The at least one processor may be configured to store a plurality of feature points corresponding to a plurality of persons in the memory; acquire a first image; acquire a first portion in which the face of at least one person is recognized in the first image; acquire a first feature point related to the face from the first portion; identify whether a second feature point corresponding to the first feature point is present in the plurality of feature points stored in the memory; and, based on no feature point corresponding to the first feature point being identified, transmit the first feature point and information related to the first feature point to an external electronic device; based on the feature point corresponding (Continued)

to the feature point related to the face being stored in the external electronic device, receive identification information of the external electronic device from the external electronic device, store the received identification information; and transmit the first image to the external electronic device.

20 Claims, 7 Drawing Sheets

(58) Field of Classification Search
CPC ........... G06F 3/005; G06F 3/011; G06N 3/08; H04N 21/2743; H04N 21/436; H04N 21/4363; H04N 21/43615; H04N 21/43637
See application file for complete search history.

(56) References Cited

U.S. PATENT DOCUMENTS

| | | |
|---|---|---|
| 2011/0047384 A1 | 2/2011 | Jacobs et al. |
| 2011/0064281 A1 | 3/2011 | Chan |
| 2014/0085488 A1 | 3/2014 | Song |
| 2016/0316012 A1 | 10/2016 | Chen et al. |
| 2017/0034097 A1 | 2/2017 | Zhang et al. |
| 2018/0205848 A1 | 7/2018 | Kong et al. |

FOREIGN PATENT DOCUMENTS

| | | |
|---|---|---|
| JP | 2011009899 A | 1/2011 |
| KR | 20060082923 A | 7/2006 |
| KR | 20110026693 A | 3/2011 |
| KR | 20120056851 A | 6/2012 |
| KR | 20140038759 A | 3/2014 |
| KR | 20150111013 A | 10/2015 |
| KR | 101619091 B1 | 5/2016 |
| KR | 20160135155 A | 11/2016 |
| KR | 20170006778 A | 1/2017 |
| KR | 101815144 B1 | 1/2018 |

OTHER PUBLICATIONS

Written Opinion of the ISA for PCT/KR2021/019852 mailed Mar. 29, 2022, 4 pages.

Office Action dated Nov. 18, 2025 in Korean Application No. 10-2021-0033204 and English-language translation.

ELECTRONIC DEVICE, OPERATING METHOD OF ELECTRONIC DEVICE, AND RECORDING MEDIUM

CROSS-REFERENCE TO RELATED APPLICATIONS

This application is a continuation of International Application No. PCT/KR2021/019852 designating the United States, filed on Dec. 24, 2021, in the Korean Intellectual Property Receiving Office and claiming priority to Korean Patent Application No. 10-2021-0033204, filed on Mar. 15, 2021, in the Korean Intellectual Property Office, the disclosures of each of which are incorporated by reference herein in their entireties.

BACKGROUND

Field

The disclosure relates to an electronic device, a method of operating the electronic device, and a recording medium.

Description of Related Art

An electronic device may share an image with a user-selected external electronic device by storing an image captured by a camera included in the electronic device and transmitting the stored image to the external electronic device.

To share the image with the external electronic device, the user may select various applications and transmit the image to the external electronic device using the selected applications.

SUMMARY

To share an image, an electronic device needs to perform many operations, such as executing a sharing application, selecting an image to share, and uploading the selected image.

Embodiments of the disclosure may provide an electronic device which may automatically and quickly share an image with at least one external electronic device, and a method of transmitting an image in the electronic device.

An electronic device according to an example embodiment of the disclosure may include a communication circuit; a memory; and at least one processor functionally connected to the communication circuit and the memory. The at least one processor may be configured to store a plurality of feature points corresponding to a plurality of persons in the memory, obtain a first image; obtain a first portion in which a face of at least one person is recognized in the first image; obtain a first feature point related to the face from the first portion in which the face is recognized; identify whether a second feature point corresponding to the first feature point among the plurality of feature points stored in the memory; and, based on no feature point corresponding to the first feature point being identified among the plurality of feature points stored in the memory, transmit the first feature point and information related to the first feature point to an external electronic device through the communication circuit, based on the second feature point being stored in the external electronic device, receive identification information about the external electronic device through the communication circuit, store the received identification information in the memory, and transmit the first image to the external electronic device.

A method of operating an electronic device according to an example embodiment of the disclosure may include storing a plurality of feature points corresponding to a plurality of persons in a memory, obtaining a first image; obtaining a first portion in which a face of at least one person is recognized in the first image; obtaining a first feature point related to the face from the first portion in which the face is recognized; identifying whether a second feature point corresponding to the first feature point is among a plurality of feature points stored in the memory; and, based on no feature point corresponding to the first feature point being identified among the plurality of feature points stored in the memory; transmitting the first feature point and information related to the first feature point to an external electronic device through a communication circuit; based on the second feature point being stored in the external electronic device, receiving identification information about the external electronic device through the communication circuit, storing the received identification information in the memory; and transmitting the first image to the external electronic device.

A non-transitory computer-readable recording medium according to an example embodiment of the disclosure may store a program which, when executed, causes an electronic device to perform operations including storing a plurality of feature points corresponding to a plurality of persons in a memory, obtaining a first image; obtaining a first portion in which a face of at least one person is recognized in the first image; obtaining a first feature point related to the face from the first portion in which the face is recognized; identifying whether there is a second feature point corresponding to the first feature point among a plurality of feature points stored in the memory; and, based on no feature point corresponding to the first feature point being identified among the plurality of feature points stored in the memory, transmitting the first feature point and information related to the first feature point to an external electronic device through a communication circuit; based on the second feature point corresponding to the feature point related to the face being stored in the external electronic device, receiving identification information about the external electronic device through the communication circuit, transmitted to the electronic device by the external electronic device; storing the received identification information in the memory; and transmitting the first image to the external electronic device.

An electronic device according to various example embodiments of the disclosure may automatically select an external electronic device with which to share an image by detecting a face in the image. Accordingly, the electronic device may, for example, provide the convenience of automatically and quickly sharing an image with at least one external electronic device without relying on a sharing application or a server service for sharing. In addition, the external electronic device may receive only an image including a user of the external electronic device without a need of selectively storing a photo shared from the electronic device and receiving an unnecessary image.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
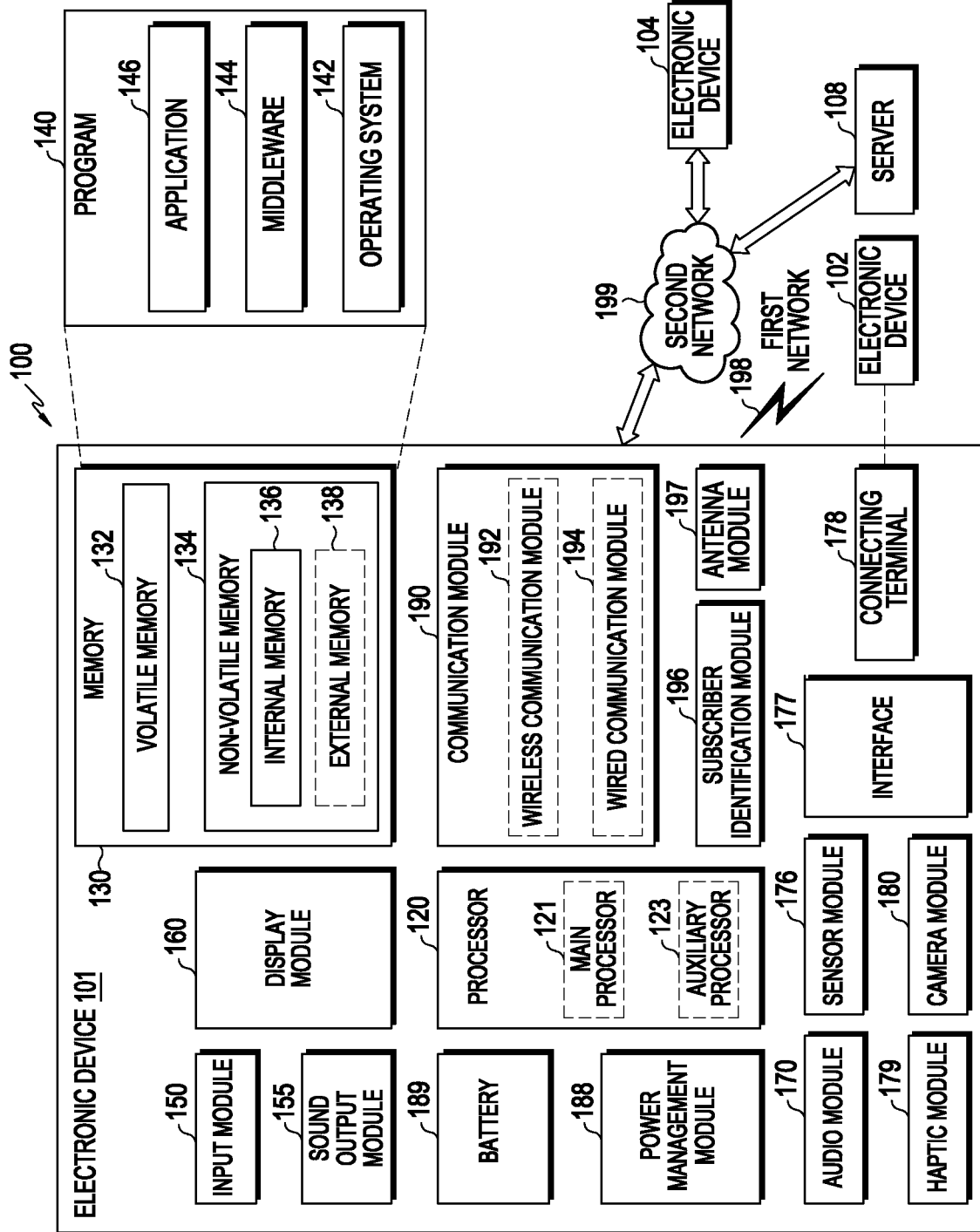
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and are intended to include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function or operation according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
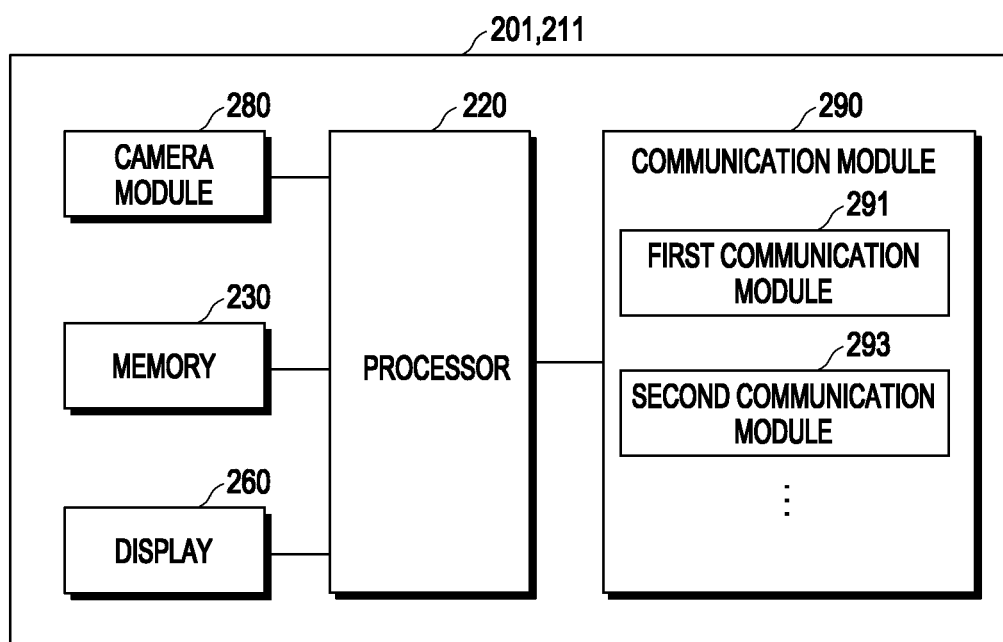
FIG. 2 is a block diagram illustrating an example electronic device according to various embodiments.

FIG. 2 is a block diagram illustrating an example electronic device according to various embodiments.

Referring to FIG. 2, an electronic device 201 (e.g., the electronic device 101 of FIG. 1) may include a processor 220, memory 230, a display 260, a camera module 280, and/or a communication module 290.

According to various embodiments, the processor 220 (including, e.g., processing circuitry) may provide overall control to the operations of the electronic device 201, and may be the same as the processor 120 of FIG. 1 or perform at least one function or operation performed by the processor 120.

According to various embodiments, when an image is captured through the camera module 280 (e.g., the camera module 180) (including, e.g., a camera), the processor 220 may obtain at least one face from the captured image. According to various embodiments, the processor 220 may detect the at least one face from the captured image using various methods, such as an image processing technique or a deep learning network and crop a detected face region from the image.

According to various embodiments, the processor 220 may obtain a feature point from the cropped image of the at least one face region, using a deep learning network.

According to various embodiments, the memory 230 may store a feature point of a user of the electronic device 201, obtained from an image including a face region of a user of the electronic device 201 using a deep learning network.

According to an embodiment, the memory 230 may store information about at least one feature point and identification information about at least one external electronic device having a history of being connected to the electronic device 201 by a short-range communication scheme and sharing an image with the electronic device 201, which have been received from the external electronic device in the process of sharing an image. According to an embodiment, the feature point information and the identification information may be stored in the form of a mapping table in the memory 230.

According to an embodiment, the processor 220 may compare the at least one feature point obtained from a captured image with at least one feature point stored in the memory 230, and identify identification information about an external electronic device that corresponds to at least one stored feature point determined as corresponding to the obtained feature point as a result of the comparison.

According to an embodiment, the processor 220 may transmit the captured image through a first communication module 291 (including, e.g., a communication circuit) in the communication module 290 to an external electronic device corresponding to the identified identification information. The first communication module 291 may, for example, be a communication module for a Wi-Fi direct communication scheme.

According to an embodiment, when the processor 220 determines that none of the feature points stored in the memory correspond to the feature point extracted from the captured image as a result of the comparison, the processor 220 may detect at least one external electronic device performing short-range communication based on signals transmitted and received through a second communication module 293 (including, e.g., a communication circuit) in the communication module 290, and transmit the feature point obtained from the captured image to the detected at least one external electronic device. The second communication module 293 may, for example, be a module for Bluetooth low energy (BLE) communication.

According to an embodiment, the processor 220 may receive feature point information and identification information about the detected at least one external electronic device from the detected at least one external electronic device through the second communication module 293. According to an embodiment, the processor 220 may transmit the captured image to the at least one external electronic device through the first communication module 291, based on the identification information received from the at least one external electronic device.

According to an embodiment, the processor 220 may share at least one image stored in the memory 230 with an external electronic device. When the at least one image stored in the memory 230 is selected for sharing, the processor 220 may obtain at least one face region from the selected at least one stored image. A feature point may be obtained from the obtained at least one face region.

According to an embodiment, the processor 220 may compare the feature point obtained from the selected at least one stored image with the at least one feature point stored in the memory 230 and identify identification information about an external electronic device corresponding to at least one stored feature point determined as corresponding to the obtained feature point as a result of the comparison.

According to an embodiment, the processor 220 may transmit the stored image to an external electronic device corresponding to the identified identification information through the first communication module 291 in the communication module 290.

According to an embodiment, when the processor 220 determines that there is no feature point corresponding to the feature point obtained from the selected at least one stored image as a result of comparing the obtained feature point with the at least one feature stored in the memory 230, the processor 220 may detect at least one external electronic device performing short-range communication based on signals transmitted and received through the second communication module 293 in the communication module 290, and control to transmit the obtained feature point to the detected at least one external electronic device.

According to an embodiment, the processor 220 may control to transmit the at least one feature point obtained from the image together with an index corresponding to the feature point to the detected at least one external electronic device. According to an embodiment, each feature point may be mapped one to one to an index indicating the feature point, and the mapping between feature points and indexes may be performed by the processor 220.

According to an embodiment, the feature point transmitted to an external electronic device may not be related to the image. Therefore, for security purposes, the feature point may be configured such that a face photo may not be reconstructed from the feature point.

According to an embodiment, the processor 220 may receive feature point information and identification information about the detected at least one external electronic device from the at least external electronic device through the second communication module 293. According to an embodiment, the feature point information received from the detected at least one external electronic device may be the index of the feature point transmitted together with the obtained feature point to the detected at least one external electronic device by the processor 220.

According to an embodiment, the processor 220 may establish a connection with the external electronic device through the first communication module 291 and transmit the stored image to the external electronic device, based on the received identification information about the external electronic device.

According to an embodiment, the processor 220 may store, in the memory 230, the feature point information and identification information about the external electronic device received through the second communication module 293. According to an embodiment, the feature point information and identification information received from the external electronic device through the second communication module 293 and stored in the memory 230 may be used later as information for transmitting a captured or selected image to the external electronic device, when the image is captured through the camera module 280 or when the image stored in the memory 230 is selected for sharing.

A feature point may, for example, be a specified region of a face. For example, feature points may be different regions (or points) of the face. The processor 220 may determine, from a plurality of feature points, the positions and sizes of the eyes, ears, nose, and mouth, the positions and sizes of the eyebrows, the darkness of the eyebrows, the positions of wrinkles, the width of the glabella, the position and size of the chin, the positions and sizes of the cheekbones, the position and size of the forehead, the contour of the face, the size of the face, a skin color, a skin tone, the color of the hair, the position of the hair, and/or the positions and sizes of scars. According to an embodiment, the processor 220 may store, in the memory 230, a feature point configured as a vector of an n-dimensional array of a plurality of feature points for each person. According to an embodiment, the processor 220 may store a feature point together with identification information about an external electronic device corresponding to the feature point in the form of a mapping table in the memory 230.

According to an embodiment, when an external electronic device with which an image is to be shared satisfies some or all of sharing conditions, the processor 220 may transmit the image to the external electronic device.

According to an embodiment, the sharing conditions may include a condition that, for example, an external electronic device has a history of sharing an image captured by the electronic device 201, a condition that the electronic device 201 receives feature point information from an external electronic device, or a condition that an image sharing function is activated in the electronic device 201 and an external electronic device.

According to an embodiment, when the external electronic device satisfies the condition that an external electronic device has a history of sharing an image captured by the electronic device 201 among the sharing conditions, the processor 220 may transmit through the communication module 290 a captured image or a stored image selected for sharing to the external electronic device in real time, based on information stored in the memory 230.

According to an embodiment, when the processor 220 receives identification information and feature point information about an external electronic device from the external electronic device through the second communication module 293, the condition that the electronic device 201 receives feature point information from an external device is satisfied, and thus the processor 220 may transmit through the communication module 290 a captured image or a stored image selected for sharing to the external electronic device.

According to an embodiment, when the image sharing function is activated in an external electronic device, the condition that the image sharing function is activated in the electronic device and the external electronic device is satisfied, and thus the processor 220 may transmit through the communication module 290 a captured image or a stored image selected for sharing to the external electronic device.

According to an embodiment, when transmitting the image to the external electronic device through the first communication module 291, the processor 220 may identify whether the image sharing function is activated in the external electronic device. According to an embodiment, when the processor 220 receives feature point information and identification information from the external electronic device through the second communication module 293, the processor 220 may identify that the image sharing function is activated in the external electronic device.

According to various embodiments, the memory 230 may be implemented substantially the same as or similar to the memory 130 of FIG. 1.

According to various embodiments, the display 260 may be implemented substantially the same as or similar to the display module 160 of FIG. 1.

According to various embodiments, the camera module 280 may be implemented substantially the same as or similar to the camera module 180 of FIG. 1, and may, for example, include at least one camera positioned on the front surface and at least one camera positioned on the rear surface.

According to various embodiments, the communication module 290 may be implemented substantially the same as or similar to the communication module 190 of FIG. 1, and a plurality of communication circuits using different communication techniques, inclusive of the communication module 290, may be included. According to an embodiment, the communication module 290 may include the first communication module 291 and the second communication module 293. The first communication module 291 may be a module for Wi-Fi direct communication. The second communication module 293 may be a module for BLE communication for transmitting a relatively small amount of data, compared to the first communication module 291.

According to an embodiment, an external electronic device that receives an image from the electronic device may, for example, also be configured as illustrated in FIG. 2.

Referring to FIG. 2, the external electronic device 211 (e.g., electronic device 101 of FIG. 1) may include the processor 220, the memory 230, the display 260, the camera module 280, and/or the communication module 290.

According to various embodiments, the processor 220 may provide overall control to the operations of the external electronic device 211, and may be the same as the processor 120 of FIG. 1 or perform at least one function or operation performed by the processor 120.

According to an embodiment, the memory 230 may store information about at least one feature point and identification information about at least one other external electronic device (e.g., "external" to external device 211) having a history of being connected to the external electronic device 211 by a short-range communication scheme and sharing an image with the external electronic device 211, which have been received from the other external electronic device in the process of sharing an image. According to an embodiment, the feature point information and the identification information may be stored in the form of a mapping table in the memory 230.

According to an embodiment, the processor 220 may store, in the memory 230, a feature point of a user of the external electronic device 211 extracted from an image including the face of the user of the external electronic device 211 and identification information about the external electronic device 211.

According to an embodiment, when there is a history of being connected to an electronic device by a short-range communication scheme and sharing an image, the processor 220 may receive an image captured by the electronic device from the electronic device through the first communication module 291 in the communication module 290, and store the image in the memory 230. The first communication module 291 may be a communication module for a Wi-Fi direct communication scheme.

According to an embodiment, the processor 220 may receive a feature point obtained from an image received from the electronic device through the second communication module 293 in the communication module 290. The second communication module 293 may be a module for BLE communication.

According to an embodiment, the processor 220 may compare the feature point received from the electronic device with the feature point of the user of the external electronic device 211 stored in the memory 230. When determining that the feature point received from the electronic device corresponds to the feature point of the user of the external electronic device 211 stored in the memory 230 as a result of the comparison, the processor 220 may transmit feature point information and the identification information about the external electronic device 211 to the electronic device through the second communication module 293.

According to an embodiment, the processor 220 may receive an image from the electronic device through the first communication module 291 in the communication module 290 in response to the transmission of the feature point information and identification information about the external electronic device 211 to the electronic device, and store the received image in the memory 230.

When determining that the feature point received from the electronic device does not correspond to the feature point of the user of the external electronic device 211 stored in the memory 230, the processor 220 may discard the received feature point and terminate the operation.

According to an embodiment, an index may be received along with the feature point from the electronic device, and when determining that the feature point received from the electronic device corresponds to the feature point of the user of the external electronic device 211 stored in the memory 230, the processor 220 may transmit the index of the feature point to the electronic device through the second communication module 293.

A feature point may be a specified region of a face. For example, feature points may be different regions (or points) of the face. The processor 220 may determine, from a plurality of feature points, the positions and sizes of the eyes, ears, nose, and mouth, the positions and sizes of the eyebrows, the darkness of the eyebrows, the positions of wrinkles, the width of the glabella, the position and size of the chin, the positions and sizes of the cheekbones, the position and size of the forehead, the contour of the face, the size of the face, a skin color, a skin tone, the color of the hair, the position of the hair, and/or the positions and sizes of scars. According to an embodiment, the processor 220 may store, in the memory 230, a feature point configured as a vector of an n-dimensional array of a plurality of feature points obtained from the face of the user.

According to various embodiments, the memory 230 may be implemented substantially the same as or similar to the memory 130 of FIG. 1.

According to various embodiments, the display 260 may be implemented substantially the same as or similar to the display module 160 of FIG. 1.

According to various embodiments, the camera module 280 may be implemented substantially the same as or similar to the camera module 180 of FIG. 1, and may include at least one camera positioned at the front surface and at least one camera positioned at the rear surface.

According to various embodiments, the communication module 290 may be implemented substantially the same as or similar to the communication module 190 of FIG. 1, and a plurality of communication circuits using different communication techniques, inclusive of the communication module 290, may be included. According to an embodiment, the communication module 290 may include the first communication module 291 and the second communication module 293. The first communication module 291 may be a module for Wi-Fi direct communication. The second communication module 293 may be a module for BLE communication, for transmitting a relatively small amount of data compared to the first communication module 291.

An electronic device according to various example embodiments may include a communication circuit; a memory; and at least one processor functionally connected to the communication circuit and the memory. The at least one processor may be configured to store a plurality of feature points corresponding to a plurality of persons in the memory, obtain a first image; obtain a first portion in which a face of at least one person is recognized in the first image; obtain a first feature point related to the face from the first portion in which the face is recognized; identify whether a second feature point corresponding to the first feature point is among the plurality of feature points stored in the memory; and, based on no feature point corresponding to the first feature point being identified among the plurality of feature points stored in the memory, transmit the first feature point and information related to the first feature point to an external electronic device through the communication circuit; based on the second feature point being stored in the external electronic device, receive identification information about the external electronic device through the communication circuit, transmitted to the electronic device by the external electronic device; store the received identification information in the memory; and transmit the first image to the external electronic device.

According to various example embodiments, the electronic device may further include a camera, and the first image may be obtained through the camera or from the memory.

According to various example embodiments, the at least one processor may be configured to, based on the second feature point being identified among the plurality of feature points stored in the memory, transmit the first image to an external electronic device corresponding to the first feature point through the communication circuit.

According to various example embodiments, the communication circuit may include a first communication circuit configured to operate in a first communication scheme and a second communication circuit configured to operate in a second communication scheme, and the at least one processor may be configured to transmit the first feature point and the information related to the first feature point to the external electronic device through the first communication circuit, and transmit the first image to the external electronic device through the second communication circuit.

According to various example embodiments, the first communication scheme may be a BLE scheme, and the second communication scheme may be a Wi-Fi direct scheme.

According to various example embodiments, the at least one processor may be configured to receive the information related to the first feature point together with the identification information about the external electronic device from the external electronic device through the communication circuit, and store the second feature point in the memory.

According to various example embodiments, the information related to the first feature point may include an index of the first feature point.

According to various example embodiments, the memory may be configured to store identification information about a plurality of external electronic devices corresponding to the plurality of feature points, respectively.

According to various example embodiments, the at least one processor may be configured to, based on the second feature point being identified among the plurality of feature points stored in the memory, transmit the first image to an external electronic device corresponding to the first feature point, based on identification information corresponding to the second feature point in the identification information about the plurality of external electronic devices.

According to various example embodiments, the at least one processor may be configured to obtain a second image, obtain a second portion in which a face of at least one person is recognized in the second image, obtain a third feature point related to the face from the second portion in which the face is recognized, identify whether a fourth feature point corresponding to the third feature point obtained from the second portion is among the plurality of feature points stored in the memory, and based on the fourth feature point obtained from the second portion corresponding to the first feature point, transmit the second image to the external electronic device through the communication circuit.

Figure 3:
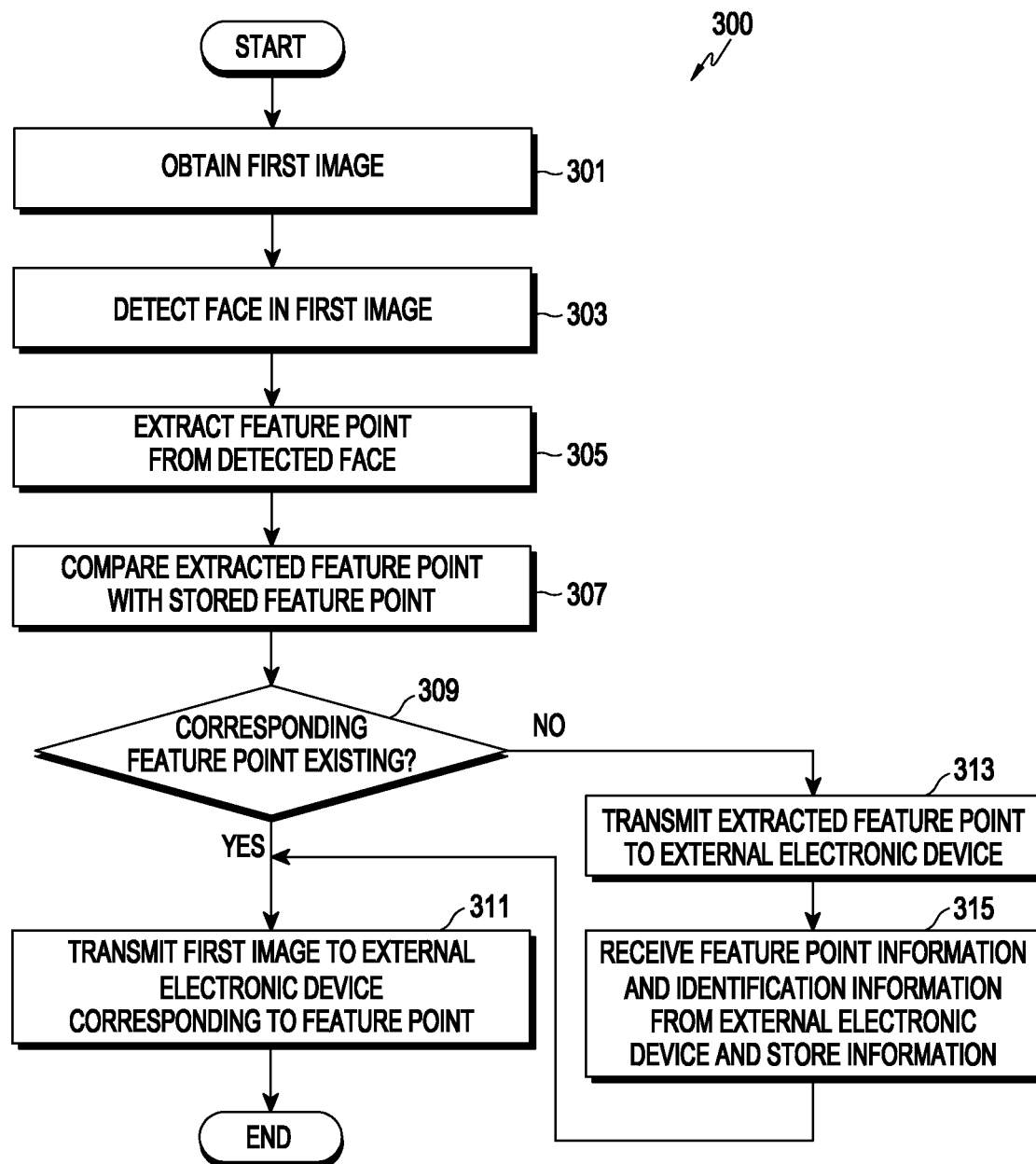
FIG. 3 is a flowchart illustrating an example operation of sharing a captured image with an external electronic device in an example electronic device according to various embodiments.

FIG. 3 is a flowchart 300 illustrating an example operation of sharing an image captured by an electronic device or stored in the electronic device with an external electronic device according to various embodiments. The operation of sharing an image may include operations 301 to 315. According to an embodiment, at least one of operations 301 to 315 may be omitted, the order of some of the operations may be changed, or other operations may be added.

In operation 301, the processor 220 of the electronic device 201 may obtain a first image. In an embodiment, the first image may be obtained through the camera module 280 or from the memory (e.g., a gallery application).

In operation 303, the processor 220 may detect at least one face in the first image, for example, using image processing or a deep learning network and crop a detected face region from the first image.

In operation 305, the processor 220 may extract a feature point from the detected at least one face, for example, using a deep learning network. In an embodiment, when a plurality of faces is detected in the first image, the processor 220 may extract at least one feature point from each of the plurality of detected faces.

In operation 307, the processor 220 may compare the feature point extracted from the first image with at least one feature point stored in the memory 230. In an embodiment, the at least one feature point stored in the memory 230 may be a feature point received from at least one external electronic device that has a history of being connected to the electronic device 201 by a short-range communication scheme. In an embodiment, feature point information and identification information about the external electronic device may be stored in the form of a mapping table in the memory 230.

In operation 309, the processor 220 may identify whether a feature point corresponding to the feature point extracted from the first image exists among the at least one feature point stored in the memory 230.

When the corresponding feature point exists, the processor 220 may identify identification information about an external electronic device corresponding to the corresponding feature point in the mapping table stored in the memory 230, and transmit the first image to the external electronic device corresponding to the identified identification information through the first communication module 291 in operation 311.

When the corresponding feature point does not exist, the processor 220 may detect at least one external electronic device performing short-range communication based on signals transmitted and received through the communication module 293, and transmit the at least one feature point extracted from the first image and/or an index of the feature point to the detected at least one external electronic device in operation 313.

In operation 315, the processor 220 may receive identification information and feature point information about the detected at least one external electronic device from the external electronic device through the communication module 293, and store a feature point corresponding to the feature point information and the identification information about the at least one external electronic device in the mapping table of the memory 230. The feature point information may, for example, be the index transmitted along with the feature point in operation 313. In an embodiment, based on the at least one external electronic device receiving the at least one feature point obtained from the first image from the electronic device 201, comparing a feature point of a user of the at least one external electronic device stored in the memory of the at least one external electronic device with the feature point received from the electronic device 201, and determining that the feature point of the user of the at least one external electronic device corresponds to the feature point received from the electronic device 201, the at least one external electronic device may transmit the identification information and feature point information about the at least one external electronic device to the electronic device 201.

In operation 311, the processor 220 may transmit the first image to the external electronic device corresponding to the received identified information through the first communication module 291.

According to an embodiment, the feature point information and identification information about the external electronic device received from the external electronic device through the communication module 293 and stored in the memory 230 may be used as information for transmitting a captured or selected image to the external electronic device, when the image is captured through the camera module 280 or when the image stored in the memory is selected for sharing.

According to an embodiment, when failing to receive a response signal from the detected at least one external electronic device for a predetermined period of time after transmitting the feature point obtained from the captured image to the detected at least one external electronic device the processor 220 may terminate the operation of sharing an image.

Figure 4:
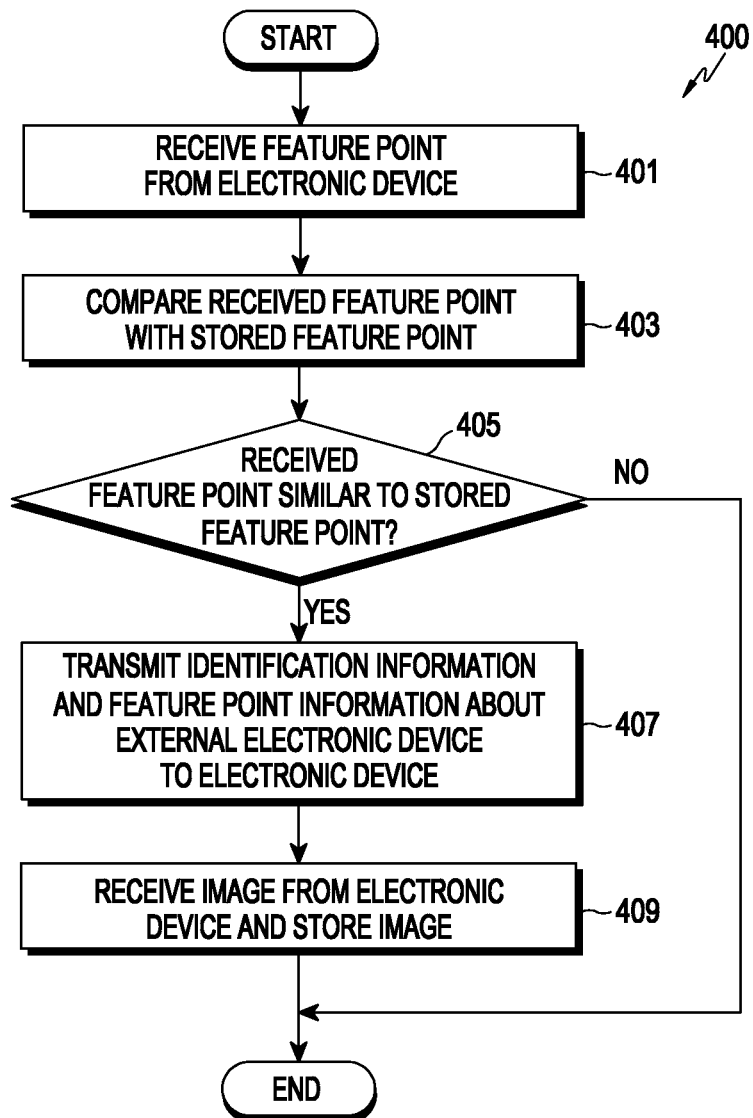
FIG. 4 is a flowchart illustrating an example operation of receiving an image from an example electronic device in an external electronic device according to various embodiments.

FIG. 4 is a flowchart 400 illustrating an example operation of receiving an image from an electronic device in an external electronic device according to various embodiments. The operation of receiving an image may include operations 401 through 409. According to an embodiment, at least one of operations 401 to 409 may be omitted, the order of some of the operations may be changed, or other operations may be added. According to an embodiment, the external electronic device may be configured to be at least partially or wholly identical to the electronic device 101 of FIG. 1 or the electronic device 201, 211 of FIG. 2.

In operation 401, the processor 220 of the external electronic device 211 may receive a feature point and/or feature point information from the electronic device through the second communication module 293. The feature point information may be an index of the feature point.

According to an embodiment, the memory 230 of the external electronic device 211 may store a feature point of a user of the external electronic device and identification information about the external electronic device extracted from an image including the face of the user of the external electronic device.

In operation 403, the processor 220 of the external electronic device 211 may compare the feature point information received from the electronic device through the second communication module 293 with the feature point of the user of the external electronic device stored in the memory 230 of the external electronic device.

In operation 405, the processor 220 of the external electronic device 211 may determine whether the feature point received from the electronic device corresponds to the feature point of the user of the external electronic device stored in the memory 230 of the external electronic device, based on a result of the comparison. In an example, the processor 220 may determine that the feature point received from the electronic device corresponds to the feature point of the user of the external electronic device stored in the memory 230 of the external electronic device if the feature point received from the electronic device is the same of the feature point of the user of the external electronic device stored in the memory 230 of the external electronic device.

When the feature point received from the electronic device is determined to correspond to the feature point of the user of the external electronic device stored in the memory of the external electronic device, the processor 220 of the external electronic device 211 may transmit the identification information about the external electronic device and acknowledgement information for the feature point received from the electronic device to the electronic device through the second communication module 293 in operation 407. The acknowledgement information for the feature point may be an index of the feature point.

In operation 409, the processor 220 of the external electronic device 211 may receive an image transmitted from the electronic device through the first communication module 291 and store it in the memory 230.

When determining that the feature point received from the electronic device does not correspond to the feature point of the user of the external electronic device stored in the memory 230 of the external electronic device, the processor 220 of the external electronic device 211 may discard the received feature point and terminate the operation.

Figure 5A:
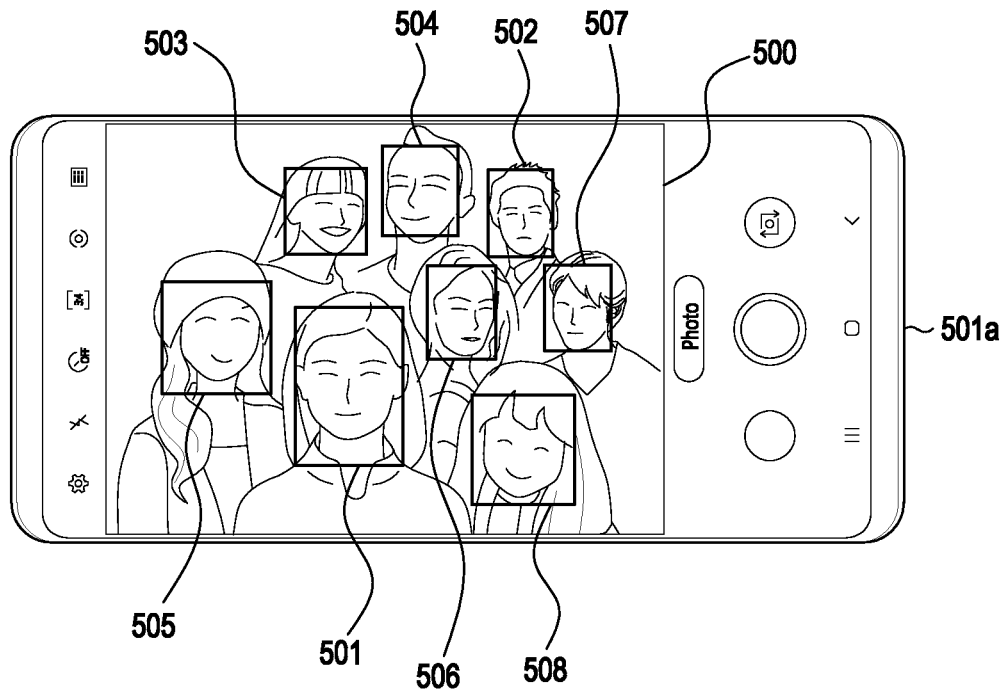
FIG. 5A and FIG. 5B are diagrams illustrating example operations of sharing an image with an external electronic device in an example electronic device according to various embodiments.
Figure 5B:
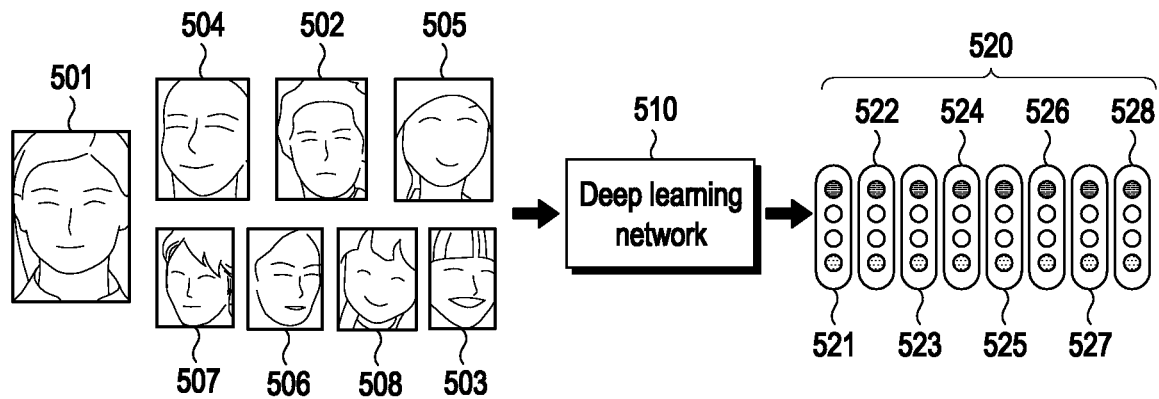

FIGS. 5A and 5B are diagrams illustrating example operations of sharing an image with an external electronic device in an electronic device according to various embodiments. The embodiment of FIGS. 5A and 5B illustrates an example case in which eight persons are photographed.

Referring to FIG. 5A, an electronic device 501a (e.g., the electronic device 201 of FIG. 2) may capture an image 500 through a camera module (e.g., the camera module 280 of FIG. 2).

The electronic device 501a may detect eight faces 501, 502, 503, 504, 505, 506, 507, and 508 from the image 500 captured through the camera module 280, using image processing or a deep learning network.

Referring to FIG. 5B, the electronic device 501a may crop out regions including the eight detected faces 501, 502, 503, 504, 505, 506, 507, and 508 from the captured image 500 illustrated in FIG. 5A.

The electronic device 501a may process the regions including the cropped eight faces 501, 502, 503, 504, 505, 506, 507, and 508 using a deep learning network 510, and extract feature points 521 to 528 for the respective eight faces as an output of the deep learning network 510.

To share the captured image 500, the electronic device 501a may compare the feature points extracted from the captured image with at least one feature point stored in the memory (e.g., the memory 230 of FIG. 2). In an embodiment, the at least one feature point stored in the memory 230 may be a feature point received from at least one external electronic device having a history of being connected to the electronic device 501a by a short-range communication scheme. According to an embodiment, feature point information and identification information about the external electronic device may be stored in the form of a mapping table in the memory 230.

A feature point of a user of the electronic device 501a may be pre-stored in the memory 230. In the process of comparing the feature points extracted from the captured image 500 with the at least one feature point stored in the memory 230 to share the captured image 500, the electronic device 501a may identify the feature point 521 of the user of the electronic device 501a and identify external electronic devices corresponding to the seven feature points 522 to 528 other than the feature point of the user of the electronic device 501a, based on the mapping table stored in the memory 230.

Figure 6:
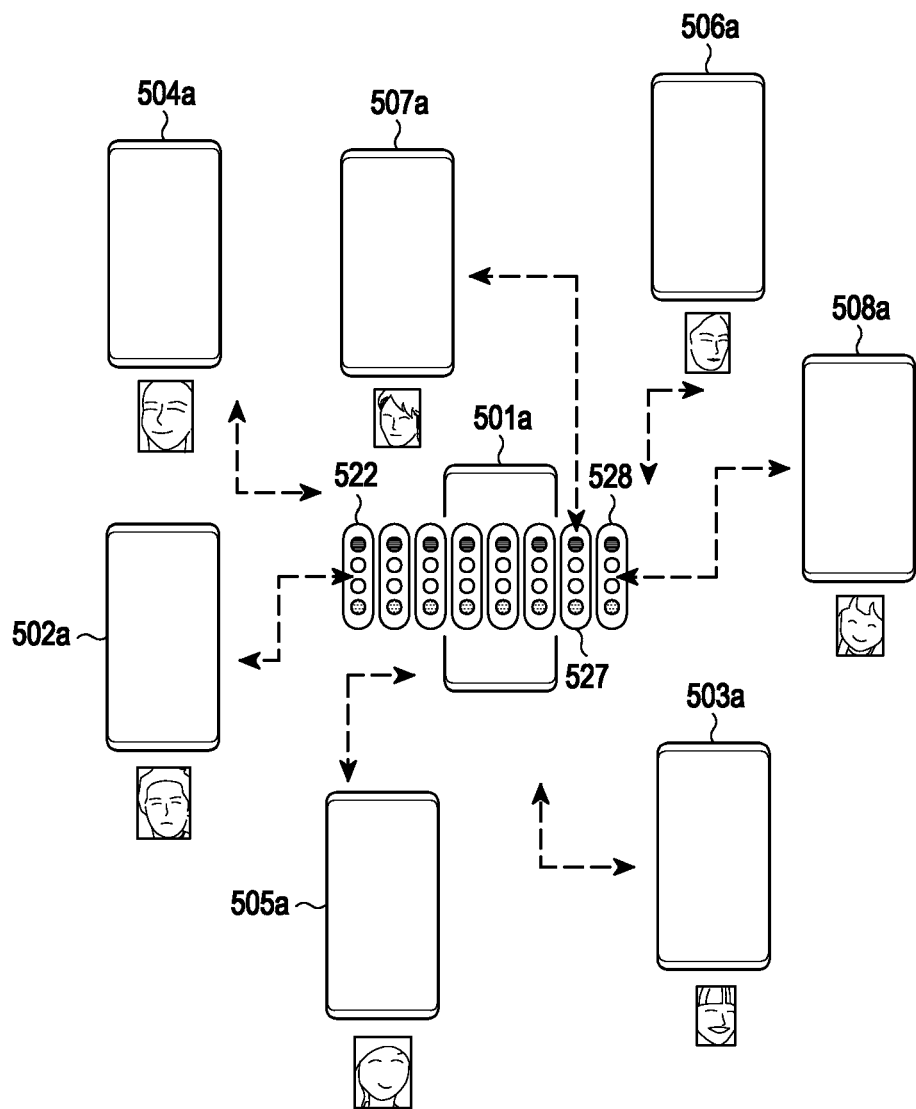
FIG. 6 is a diagram illustrating an example operation of sharing an image with an external electronic device in an example electronic device according to various embodiments.

FIG. 6 is a diagram illustrating an example operation of sharing an image with an external electronic device in an electronic device according to various embodiments. In the embodiment of FIG. 6, external electronic devices 503a, 504a, 505a, and 506a corresponding to four ones 523, 524, 525, and 526 of the seven feature points 522 to 528 have a connection history with the electronic device 501a, and external electronic devices 502a, 507a, and 508a corresponding to the three feature points 522, 527, and 528 have no connection history.

Referring to FIG. 6, the electronic device 501a may identify that the four ones 523, 524, 525, and 526 correspond to feature points stored in the memory 230, and the three feature points 522, 527, and 528 do not correspond to feature points stored in the memory 230, among the seven feature points 522 to 528.

The electronic device 501a may identify identification information about the external electronic devices 502a, 503a, 504a, and 506a corresponding to the four feature points 522, 523, 524, and 526 based on the mapping table stored in the memory 230, and transmit the captured image 500 to the external electronic devices 502a, 503a, 504a, and 506a through a communication module (e.g., the first communication module 291 of FIG. 2), based on the identified identification information. The external electronic devices 502a, 503a, 504a, and 506a with the image sharing function activated therein may receive the image 500 transmitted from the electronic device 501a through the communication modules 291 and store it in the respective memories.

The electronic device 501a may detect external electronic devices located in the vicinity through a communication module (e.g., the second communication module 293 of FIG. 2) to transmit the captured image 500 to the external electronic devices 505a, 507a, and 508a corresponding to the three feature points 525, 527, and 528 determined not to correspond to the feature points stored in the memory 230. In FIG. 6, the electronic device 501a may detect the seven external electronic devices 502a to 508a and identify the external electronic devices 505a, 507a, and 508a except for the external electronic devices 502a, 503a, 504a, and 506a whose connection histories have been identified and to which the image 500 has been transmitted.

The electronic device 501a may transmit feature points 520 including the seven feature points 522 to 528 and/or indexes of feature points to the identified external electronic devices 505a, 507a, and 508a through the communication module 293.

Figure 7:
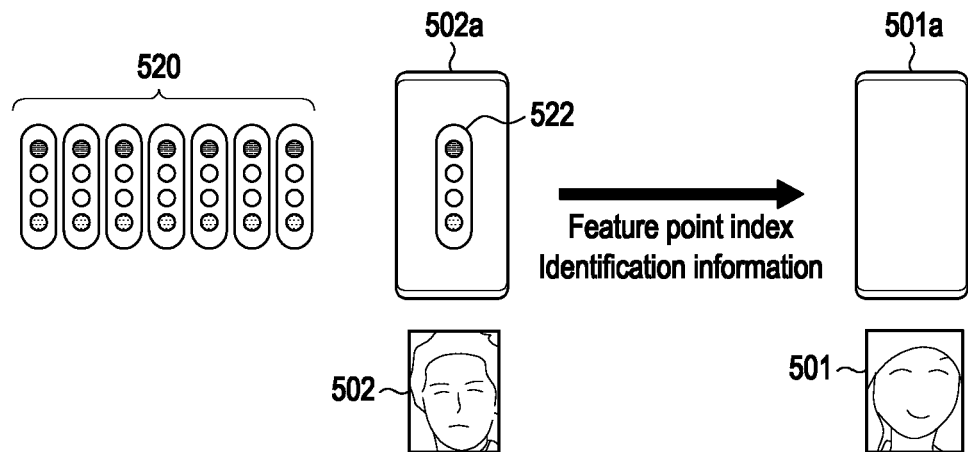
FIG. 7 is a diagram illustrating an example operation of receiving an image from an example electronic device in an external electronic device according to various embodiments.

FIG. 7 is a diagram illustrating an example operation of receiving an image from an electronic device in an external electronic device according to various embodiments. In the embodiment of FIG. 7, the external electronic device 502a has received the feature points 520 from the electronic device 501a. To receive the image 500, the memory 230 of the external electronic device 502a may store a feature point of the user of the external electronic device 502a extracted from an image including the face of the user.

Referring to FIG. 7, the external electronic device 502a, which has received the feature points 520 from the electronic device 501a, may compare the received feature points 520 with the feature point of the user of the external electronic device 502a stored in the memory 230.

The external electronic device 502a may identify the feature point 522 corresponding to the feature point of the user stored in the memory 230 among the feature points 520 received from the electronic device 501a, and transmit the identified feature point 522 or an index of the feature point 522 and identification information about the external electronic device 502a to the electronic device 501a through the communication module 293, to receive the image 500. The feature point and/or the index of the feature point and the identification information about the external electronic device 502a may be stored in the memory of the electronic device 501a.

The external electronic device 502a may receive the image 500 from the electronic device 501a through the communication module 293, and a connection may be established between the external electronic device 502a and the electronic device 501a.

From this time on, the external electronic device 502a may receive an image from the electronic device 501a through the communication module 291 without transmitting the feature point or the index of the feature point, and the identification information to the electronic device 501a.

When there is no feature point corresponding to the feature point of the user of the external electronic device 502a stored in the memory 230 among the feature points 520 received from the electronic device 501a, the external electronic device 502a may discard the received feature point and terminate the operation.

Figure 8:
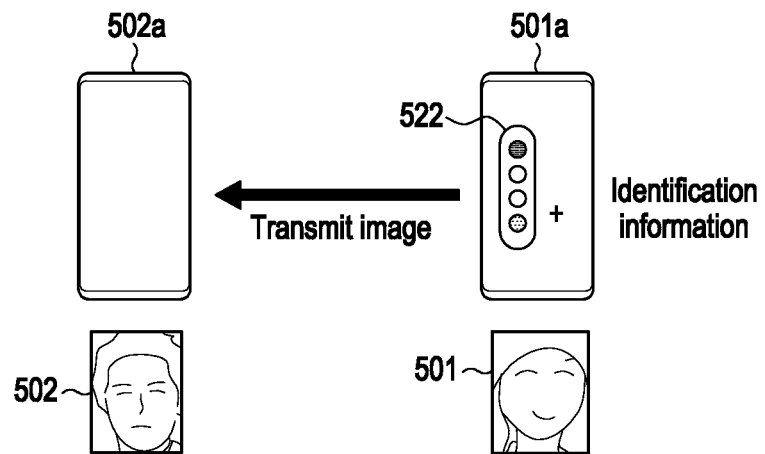
FIG. 8 is a diagram illustrating an example operation of receiving an image from an example electronic device in an external electronic device according to various embodiments.

FIG. 8 is a diagram illustrating an example operation of receiving an image from an electronic device in an external electronic device according to various embodiments. In the embodiment of FIG. 8, the external electronic device 502a has transmitted the identification information and feature point information about the external electronic device 502a to the electronic device 501a.

Referring to FIG. 8, when the electronic device 501a receives, from the external electronic device 502a, the identification information and feature point information about the external electronic device 502a, the electronic device 501a may store the identification information and the feature point information received from the external electronic device 502a in the memory, and the external electronic device 502a may receive an image from the electronic device 501a through a communication module (e.g., the communication module 190 of FIG. 1 or the first communication module 291 of FIG. 2) based on the identification information and store the image in the memory. In an embodiment, the feature point information may be the index of the feature point 522.

When receiving another image from the electronic device 501a, the external electronic device 502a may receive the image from the electronic device 501a through the communication module 291 and store it in the memory 230 without transmitting the identification information and the feature point information to the electronic device 501a.

A method of operating an electronic device according to various example embodiments of the disclosure may include storing a plurality of feature points corresponding to a plurality of persons in a memory, obtaining a first image;

obtaining a first portion in which a face of at least one person is recognized in the first image; obtaining a first feature point related to the face from the first portion in which the face is recognized; identifying whether a second feature point corresponding to the first feature point is among a plurality of feature points stored in the memory; and, based on no feature point corresponding to the first feature point being identified among the plurality of feature points stored in the memory, transmitting the first feature point and information related to the first feature point to an external electronic device through a communication circuit; based on the second feature point being stored in the external electronic device, receiving identification information about the external electronic device through the communication circuit, transmitted to the electronic device by the external electronic device; storing the received identification information in the memory; and transmitting the first image to the external electronic device.

According to various example embodiments, the first image may be obtained through a camera or from the memory.

According to various example embodiments, the method may further include, based on the second feature point being identified among the plurality of feature points stored in the memory, transmitting the first image to an external electronic device corresponding to the first feature point through the communication circuit.

According to various example embodiments, the communication circuit may include a first communication circuit operating in a BLE scheme and a second communication circuit operating in a Wi-Fi direct scheme, and the method may further include transmitting the first feature point and the information related to the first feature point to the external electronic device through the first communication circuit, and transmitting the first image to the external electronic device through the second communication circuit.

According to various example embodiments, the method may further include receiving the information related to the first feature point together with the identification information about the external electronic device from the external electronic device through the communication circuit, and storing the first feature point in the memory.

According to various example embodiments, the information related to the feature point may include an index of the first feature point.

According to various example embodiments, the memory may be configured to store identification information about a plurality of external electronic devices corresponding to the plurality of feature points, respectively.

According to various example embodiments, the method may further include, based on the second feature point being identified among the plurality of feature points stored in the memory, transmitting the first image to an external electronic device corresponding to the first feature point, based on identification information corresponding to the second feature point in the identification information about the plurality of external electronic devices.

According to various example embodiments, the method may further include obtaining a second image, obtaining a second portion in which a face of at least one person is recognized in the second image, obtaining a third feature point related to the face from the second portion in which the face is recognized, identifying whether a fourth feature point corresponding to the third feature point obtained from the second portion is among the plurality of feature points stored in the memory, and, based on the fourth feature point obtained from the second portion being identified as corresponding to the first feature point, transmitting the second image to the external electronic device through the communication circuit.

Further, the data structure used in the above-described embodiments of the disclosure may be recorded on a computer-readable recording medium in various manners. The computer-readable recording medium may include, for example, storage media such as magnetic storage media (e.g., ROM, floppy disk, hard disk, and so on) and optical reading media (e.g., CD-ROM, DVD, and so on).

A non-transitory computer-readable recording medium recording computer-executable programs may record a program which, when executed, executes, to share an image in an electronic device, storing a plurality of feature points corresponding to a plurality of persons in a memory, obtaining a first image; obtaining a first portion in which a face of at least one person is recognized in the first image; obtaining a first feature point related to the face from the first portion in which the face is recognized; identifying whether there is a second feature point corresponding to the first feature point among a plurality of feature points stored in the memory; and, based on no feature point corresponding to the first feature point being identified among the plurality of feature points stored in the memory, transmitting the first feature point and information related to the first feature point to an external electronic device through a communication circuit, based on the second feature point being stored in the external electronic device, receiving identification information about the external electronic device through the communication circuit, and storing the received identification information in the memory.

The disclosure has been described above with reference to preferred embodiments thereof. Those skilled in the art will understand that the disclosure can be implemented in a modified form without departing from the subject matter of the disclosure. Therefore, the disclosed embodiments should be considered from an illustrative perspective rather than a restrictive perspective. The scope of the disclosure is defined not by the foregoing description but by the claims, and all differences within their equivalency are to be construed as encompassed in the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a communication circuit;
   memory; and
   at least one processor comprising processing circuitry functionally connected to the communication circuit and the memory,
   wherein the at least one processor is configured to:
      store a plurality of feature points corresponding to a plurality of persons in the memory,
      obtain a first image,
      obtain a first portion in which a face of at least one person is recognized in the first image,
      obtain a first feature point related to the face from the first portion in which the face is recognized, identify whether a second feature point corresponding to the first feature point is among the plurality of feature points stored in the memory, and based on no feature point corresponding to the first feature point being identified among the plurality of feature points stored in the memory, transmit the first feature point and information related to the first feature point to an external electronic device through the communication circuit, based on the second feature point being stored in the external electronic device, receive identification information about the external electronic device through the communication circuit, store the received identification information in the memory, and transmit the first image to the external electronic device.

2. The electronic device of claim 1, further comprising a camera, wherein the first image is obtained through the camera or from the memory.

3. The electronic device of claim 1, wherein the at least one processor is configured to, based on the second feature point being identified among the plurality of feature points stored in the memory, transmit the first image to an external electronic device corresponding to the first feature point through the communication circuit.

4. The electronic device of claim 1, wherein the communication circuit includes a first communication circuit configured to operate in a first communication scheme and a second communication circuit configured to operate in a second communication scheme, wherein the at least one processor is configured to:
transmit the first feature point and the information related to the first feature point to the external electronic device through the first communication circuit, and transmit the first image to the external electronic device through the second communication circuit, and wherein the first communication scheme comprises a Bluetooth low energy scheme, and the second communication scheme comprises a wireless fidelity (Wi-Fi) direct scheme.

5. The electronic device of claim 1, wherein the at least one processor is configured to receive the information related to the first feature point together with the identification information about the external electronic device from the external electronic device through the communication circuit, and store the first feature point in the memory, and wherein the at least one processor is configured to:
obtain a second image,
obtain a second portion in which a face of at least one person is recognized in the second image,
obtain a third feature point related to the face from the second portion in which the face is recognized,
identify whether a fourth feature point corresponding to the third feature point is among the plurality of feature points stored in the memory, and
based on identifying that the fourth feature point corresponds to the first feature point, transmit the second image to the external electronic device through the communication circuit.

6. The electronic device of claim 1, wherein the information related to the first feature point includes an index of the first feature point.

7. The electronic device of claim 3, wherein the at least one processor is configured to store, in the memory, identification information about a plurality of external electronic devices corresponding to the plurality of feature points, respectively, and wherein the at least one processor is configured to, based on the second feature point being identified among the plurality of feature points stored in the memory, transmit the first image to an external electronic device corresponding to the first feature point, based on identification information corresponding to the second feature point among the identification information about the plurality of external electronic devices.

8. A method of operating an electronic device, the method comprising:
storing a plurality of feature points corresponding to a plurality of persons in a memory,
obtaining a first image,
obtaining a first portion in which a face of at least one person is recognized in the first image,
obtaining a first feature point related to the face from the first portion in which the face is recognized,
identifying whether a second feature point corresponding to the first feature point is among a plurality of feature points stored in the memory, and
based on no feature point corresponding to the first feature point being identified among the plurality of feature points stored in the memory,
transmitting the first feature point and information related to the first feature point to an external electronic device through a communication circuit, based on the second feature point being stored in the external electronic device,
receiving identification information about the external electronic device through the communication circuit,
storing the received identification information in the memory, and
transmitting the first image to the external electronic device.

9. The method of claim 8, wherein the first image is obtained through a camera or from the memory.

10. The method of claim 8, further comprising, based on the second feature point being identified among the plurality of feature points stored in the memory, transmitting the first image to an external electronic device corresponding to the first feature point through the communication circuit.

11. The method of claim 8, wherein the communication circuit includes a first communication circuit operating in a Bluetooth low energy scheme and a second communication circuit operating in a wireless fidelity (Wi-Fi) direct scheme, and wherein the method further comprises:
transmitting the first feature point and the information related to the first feature point to the external electronic device through the first communication circuit, and
transmitting the first image to the external electronic device through the second communication circuit.

12. The method of claim 8, further comprising:
receiving the information related to the first feature point with the identification information about the external electronic device from the external electronic device through the communication circuit,
storing the first feature point in the memory,
obtaining a second image,
obtaining a second portion in which a face of at least one person is recognized in the second image, obtaining a third feature point related to the face from the second portion in which the face is recognized, identifying whether a fourth feature point corresponding to the third feature point is among the plurality of feature points stored in the memory, and based on the fourth feature point corresponding to the first feature point, transmitting the second image to the external electronic device through the communication circuit.

13. The method of claim 8, wherein the information related to the first feature point includes an index of the first feature point.

14. The method of claim 10, wherein identification information about a plurality of external electronic devices corresponding to the plurality of feature points is stored in the memory, respectively, and wherein the method further comprises, based on the second feature point being identified among the plurality of feature points stored in the memory, transmitting the first image to an external electronic device corresponding to the first feature point, based on identification information corresponding to the second feature point in the identification information about the plurality of external electronic devices.

15. A non-transitory computer-readable recording medium storing a program which when executed, causes an electronic device to perform operations comprising:

storing a plurality of feature points corresponding to a plurality of persons in a memory, obtaining a first image, obtaining a first portion in which a face of at least one person is recognized in the first image, obtaining a first feature point related to the face from the first portion in which the face is recognized, identifying whether there is a second feature point corresponding to the first feature point among a plurality of feature points stored in the memory, and based on no feature point corresponding to the first feature point being identified among the plurality of feature points stored in the memory, transmitting the first feature point and information related to the first feature point to an external electronic device through a communication circuit, based on the second feature point being stored in the external electronic device, receiving identification information about the external electronic device through the communication circuit, storing the received identification information in the memory, and transmitting the first image to the external electronic device.

16. The non-transitory computer-readable recording medium of claim 15, wherein the program which when executed, causes the electronic device to perform operations further comprising:

based on the second feature point being identified among the plurality of feature points stored in the memory, transmitting the first image to an external electronic device corresponding to the first feature point through the communication circuit.

17. The non-transitory computer-readable recording medium of claim 15, wherein the communication circuit includes a first communication circuit operating in a Bluetooth low energy scheme and a second communication circuit operating in a wireless fidelity (Wi-Fi) direct scheme, and wherein the program which when executed, causes the electronic device to perform operations further comprises:

transmitting the first feature point and the information related to the first feature point to the external electronic device through the first communication circuit, and transmitting the first image to the external electronic device through the second communication circuit.

18. The non-transitory computer-readable recording medium of claim 15, wherein the program which when executed, causes the electronic device to perform operations further comprising:

receiving the information related to the first feature point with the identification information about the external electronic device from the external electronic device through the communication circuit, storing the first feature point in the memory, obtaining a second image, obtaining a second portion in which a face of at least one person is recognized in the second image, obtaining a third feature point related to the face from the second portion in which the face is recognized, identifying whether a fourth feature point corresponding to the third feature point is among the plurality of feature points stored in the memory, and based on the fourth feature point corresponding to the first feature point, transmitting the second image to the external electronic device through the communication circuit.

19. The non-transitory computer-readable recording medium of claim 15, wherein the information related to the first feature point includes an index of the first feature point.

20. The non-transitory computer-readable recording medium of claim 15, wherein the first image is obtained through a camera or from the memory, wherein identification information about a plurality of external electronic devices corresponding to the plurality of feature points is stored in the memory, respectively, and wherein the program which when executed, causes the electronic device to perform operations further comprises:

based on the second feature point being identified among the plurality of feature points stored in the memory, transmitting the first image to an external electronic device corresponding to the first feature point, based on identification information corresponding to the second feature point in the identification information about the plurality of external electronic devices.

* * * * *